(12) United States Patent
Peters et al.

(10) Patent No.: US 8,719,174 B2
(45) Date of Patent: May 6, 2014

(54) METHOD, SYSTEM, AND COMPUTER PROGRAM PRODUCT FOR COLLABORATIVE AND INTEGRATED INTELLECTUAL PROPERTY MANAGEMENT

(75) Inventors: Daniel J. Peters, Poughquag, NY (US); Joseph P. DeMarco, Newburgh, NY (US); Randolph B. Kathmann, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 11/560,054

(22) Filed: Nov. 15, 2006

(65) Prior Publication Data

US 2008/0114668 A1    May 15, 2008

(51) Int. Cl.
 *G06Q 50/00* (2012.01)
(52) U.S. Cl.
 USPC .......................................... 705/310; 705/301
(58) Field of Classification Search
 USPC ...................................... 705/1, 1.1, 301, 310
 See application file for complete search history.

(56) References Cited

U.S. PATENT DOCUMENTS

| | | | |
|---|---|---|---|
| 5,182,705 A | | 1/1993 | Barr et al. |
| 5,548,506 A | | 8/1996 | Srinivasan |
| 5,596,750 A | * | 1/1997 | Li et al. ......................... 718/101 |
| 5,734,837 A | * | 3/1998 | Flores et al. .................. 705/7.13 |
| 5,754,840 A | | 5/1998 | Rivette et al. |
| 5,999,907 A | | 12/1999 | Donner |
| 6,014,663 A | | 1/2000 | Rivette et al. |
| 6,076,105 A | | 6/2000 | Wolff et al. |
| 6,088,679 A | * | 7/2000 | Barkley ........................ 705/7.26 |
| 6,154,725 A | | 11/2000 | Donner |
| 6,263,314 B1 | * | 7/2001 | Donner .............................. 705/1 |
| 6,308,164 B1 | | 10/2001 | Nummelin et al. |
| 6,556,992 B1 | | 4/2003 | Barney et al. |
| 6,606,740 B1 | * | 8/2003 | Lynn et al. ..................... 717/100 |
| 6,721,793 B1 | | 4/2004 | Corless |
| RE38,633 E | | 10/2004 | Srinivasan |
| 7,069,536 B2 | * | 6/2006 | Yaung ............................ 717/102 |
| 2002/0022974 A1 | | 2/2002 | Lindh |
| 2002/0059076 A1 | * | 5/2002 | Grainger et al. .................. 705/1 |
| 2002/0082890 A1 | | 6/2002 | Bracchitta et al. |
| 2002/0091541 A1 | | 7/2002 | Lundberg |

(Continued)

OTHER PUBLICATIONS

Pyron, Tim, "Special Edition Using Miscrosoft Office Project 2003," Feb. 3, 2004.*

*Primary Examiner* — Carrie Gilkey
(74) *Attorney, Agent, or Firm* — Cantor Colburn LLP; Parashos Kalaitzis

(57) ABSTRACT

A method, system, and computer program product for collaborative and integrated intellectual property management are provided. The method includes defining a sequence of phases for an intellectual property management model. The phases are defined by task-based components in conjunction with a workflow component and a messaging component. The task-based components specify a sequence of tasks implemented for achieving a desired outcome for a respective phase and also specify at least one of a resource and a role assigned to implement one or more of the sequence of tasks. A portion of the task-based components interact and share information with others of the task-based components via the workflow component and messaging component, thereby integrating operations between respective task-based components and phases. The method also includes applying the intellectual property management model to a set of inputs associated with data corresponding to a request to protect a proposed idea or concept.

30 Claims, 6 Drawing Sheets

(56) References Cited

U.S. PATENT DOCUMENTS

| | | |
|---|---|---|
| 2002/0116395 A1 | 8/2002 | Christensen |
| 2002/0156712 A1 | 10/2002 | Rambhia |
| 2002/0178029 A1 | 11/2002 | Nutter et al. |
| 2002/0184044 A1 | 12/2002 | Reader |
| 2003/0028460 A1 | 2/2003 | Kraemer |
| 2003/0135399 A1* | 7/2003 | Ahamparam et al. ............ 705/7 |
| 2003/0172020 A1* | 9/2003 | Davies et al. .................. 705/36 |
| 2003/0182172 A1 | 9/2003 | Claggett et al. |
| 2003/0204538 A1 | 10/2003 | Keene |
| 2003/0212706 A1 | 11/2003 | Shih |
| 2004/0010393 A1 | 1/2004 | Barney |
| 2004/0015556 A1* | 1/2004 | Chopra ........................ 709/206 |
| 2004/0015821 A1 | 1/2004 | Lu et al. |
| 2004/0024629 A1 | 2/2004 | Kirby, Jr. et al. |
| 2004/0088332 A1 | 5/2004 | Lee et al. |
| 2004/0181427 A1 | 9/2004 | Stobbs et al. |
| 2004/0210470 A1 | 10/2004 | Rusk |
| 2009/0083109 A1* | 3/2009 | Frank et al. ...................... 705/8 |

* cited by examiner

| ELEMENT | INNOVATORS & CREATORS | EVALUATORS | BUSINESS DEVELOPERS | EXTERNAL LEGAL PROFESSIONALS | INTERNAL LEGAL PROFESSIONALS |
| --- | --- | --- | --- | --- | --- |
| TITLE | R | O | O | R | R |
| INVENTOR NAMES | R | N | N | O | O |
| ROUGH FIGURES | R | O | N | O | O |
| FIELD OF INVENTION | R | O | N | R | R |
| BACKGROUND OF INVENTION | O | R | O | R | R |
| PRIOR ART SEARCH | R | R | R | R | R |
| OBJECTS AND ADVANTAGES | N | N | N | R | R |
| SUMMARY | O | R | O | R | R |
| DESCRIPTION OF FIGURES | R | N | R | R | R |
| DETAILED DESCRIPTION | O | N | N | R | R |
| CONCLUSION / BROADENING | O | N | O | R | R |
| FINAL FIGURES | O | N | O | R | R |
| CLAIMS | O | N | O | R | R |
| ABSTRACT | N | N | N | R | R |
| COMPLETE APPLICATION | | | | | |

FIG. 5

| COMPONENT | PHASE | 120 CREATION | 130 EVALUATION | 140 SUBMISSION | 150 REVIEW AND APPROVAL | 160 MAINTENANCE | 170 COMPENSATION, LICENSING AND ENFORCEMENT | 180 PROTOTYPING AND IMPLEMENTATION |
|---|---|---|---|---|---|---|---|---|
| 248 | PERMISSIONS & SECURITY | R | R | R | R | R | R | R |
| 250 | WORKFLOW | R | R | R | R | R | R | R |
| 252 | MESSAGING | R | R | R | R | R | R | R |
| 254 | CLASSIFICATION | R | R | O | O | O | O | O |
| 256 | IDEA | R | N | N | O | N | N | O |
| 258 | RESEARCH | R | R | N | R | O | R | O |
| 260 | EVALUATION | N | R | N | R | R | O | O |
| 262 | VALUATION | N | R | N | R | O | R | R |
| 264 | SCHEDULING | N | R | R | R | R | R | N |
| 266 | ANALYTICS | R | R | R | R | R | R | R |
| 268 | SUBMISSION | N | N | R | N | N | N | N |
| 270 | RECOGNITION | N | N | R | N | O | R | N |
| 272 | REVENUE & BILLING | N | N | O | N | N | R | N |
| 274 | LICENSING & AGREEMENTS | N | N | N | O | N | R | N |
| 276 | TRAINING & EDUCATION | R | R | R | R | R | R | R |

FIG. 6

METHOD, SYSTEM, AND COMPUTER PROGRAM PRODUCT FOR COLLABORATIVE AND INTEGRATED INTELLECTUAL PROPERTY MANAGEMENT

BACKGROUND OF THE INVENTION

The present disclosure relates generally to managing intellectual property, and in particular, to a method, system, and computer program product for collaborative and integrated intellectual property management.

The management of intellectual property tends to be sequential in nature, starting with the emergence of an innovative idea and ending with some form of implementation, financial and legal arrangement, and/or enforcement of the intellectual property rights. The current art focuses on the maintenance of documents pertaining to intellectual property for legal reasons, capabilities to search for prior art, tracking and providing status of intellectual property in database repositories, and automation of intellectual property evaluations. While these functions or capabilities provide a degree of control and productivity, they are not deemed optimal due to their lack of integration, management oversight, project management discipline, portfolio management, valuation management, and quality of the intellectual property submissions.

There are a number of deficiencies within the current intellectual property management processes such as a lack of management involvement, the failure to link an organization's strategy to the intellectual property portfolio, lack of knowledge by creators, innovators, evaluators, and legal professionals of the intellectual property management processes, lack of interactions between business developers and intellectual property portfolio managers, lengthy and bureaucratic processes that are not transparent to creators and innovators, chronic delays, heavy reliance on sequential processes with little value add provided between the various handoffs, capricious decision making by evaluators and legal professionals, lack of awareness of the advances in the field, and lack of timely rewards and recognition.

Existing solutions tend to rely or focus on point solutions or technology to meet individual problems at specific phases of the intellectual property process. However, none of these solutions addresses the end-to-end integration, especially the management system, portfolio management, oversight issues required to create and protect intellectual property, and the like. This generally requires project management with associated workflow between multiple user groups, and the optimal allocation and scheduling of constrained and skilled resources. Also noticeably absent from current solutions is the notion of intellectual property quality assessment and oversight.

One daunting challenge is the virtual collaboration of creators, innovators, business developers, and legal professionals at disparate locations, as well as the reduction of widespread inefficiencies within the intellectual property process. These process inefficiencies and lack of quality increase cycle times from intellectual property creation to implementation, maintenance and enforcement.

What is needed, therefore, is a way to integrate disparate elements of intellectual property processes, provide sound project management, increase intellectual property quality, and ensure timely workflow.

BRIEF SUMMARY OF THE INVENTION

Embodiments of the invention include a method for collaborative and integrated intellectual property management. The method includes defining a sequence of phases for an intellectual property management model. The phases are defined by task-based components in conjunction with a workflow component and a messaging component. The task-based components specify a sequence of tasks implemented for achieving a desired outcome for a respective phase and also specify at least one of a resource and a role assigned to implement one or more of the sequence of tasks. A portion of the task-based components interacts and shares information with others of the task-based components via the workflow component and messaging component, thereby integrating operations between respective task-based components and phases. The method also includes applying the intellectual property management model to a set of inputs associated with data corresponding to a request to protect a proposed idea or concept.

Additional embodiments include a system for collaborative and integrated intellectual property management. The system includes a host system and a collaborative intellectual property management application executing on the host system. The collaborative intellectual property management application implements a method. The method includes defining a sequence of phases for an intellectual property management model. The phases are defined by task-based components in conjunction with a workflow component and a messaging component. The task-based components specify a sequence of tasks implemented for achieving a desired outcome for a respective phase and also specify at least one of a resource and a role assigned to implement one or more of the sequence of tasks. A portion of the task-based components interacts and shares information with others of the task-based components via the workflow component and messaging component, thereby integrating operations between respective task-based components and phases. The method also includes applying the intellectual property management model to a set of inputs associated with data corresponding to a request to protect a proposed idea or concept.

Further embodiments include a computer program product for collaborative and integrated intellectual property management. The computer program product includes instructions for causing a computer to implement a method. The method includes defining a sequence of phases for an intellectual property management model. The phases are defined by task-based components in conjunction with a workflow component and a messaging component. The task-based components specify a sequence of tasks implemented for achieving a desired outcome for a respective phase and also specify at least one of a resource and a role assigned to implement one or more of the sequence of tasks. A portion of the task-based components interacts and shares information with others of the task-based components via the workflow component and messaging component, thereby integrating operations between respective task-based components and phases. The method also includes applying the intellectual property management model to a set of inputs associated with data corresponding to a request to protect a proposed idea or concept.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5 is a sample template and workflow for a course of action selected in response to the creation and evaluation phases of the process architecture shown in FIG. 2 in exemplary embodiments; and FIG. 6 is a diagram depicting a table including event- and workflow-driven process phases and their respective integration with application components of the system architecture of FIG. 1 and process architecture of FIG. 2 in exemplary embodiments.

Figure 1:
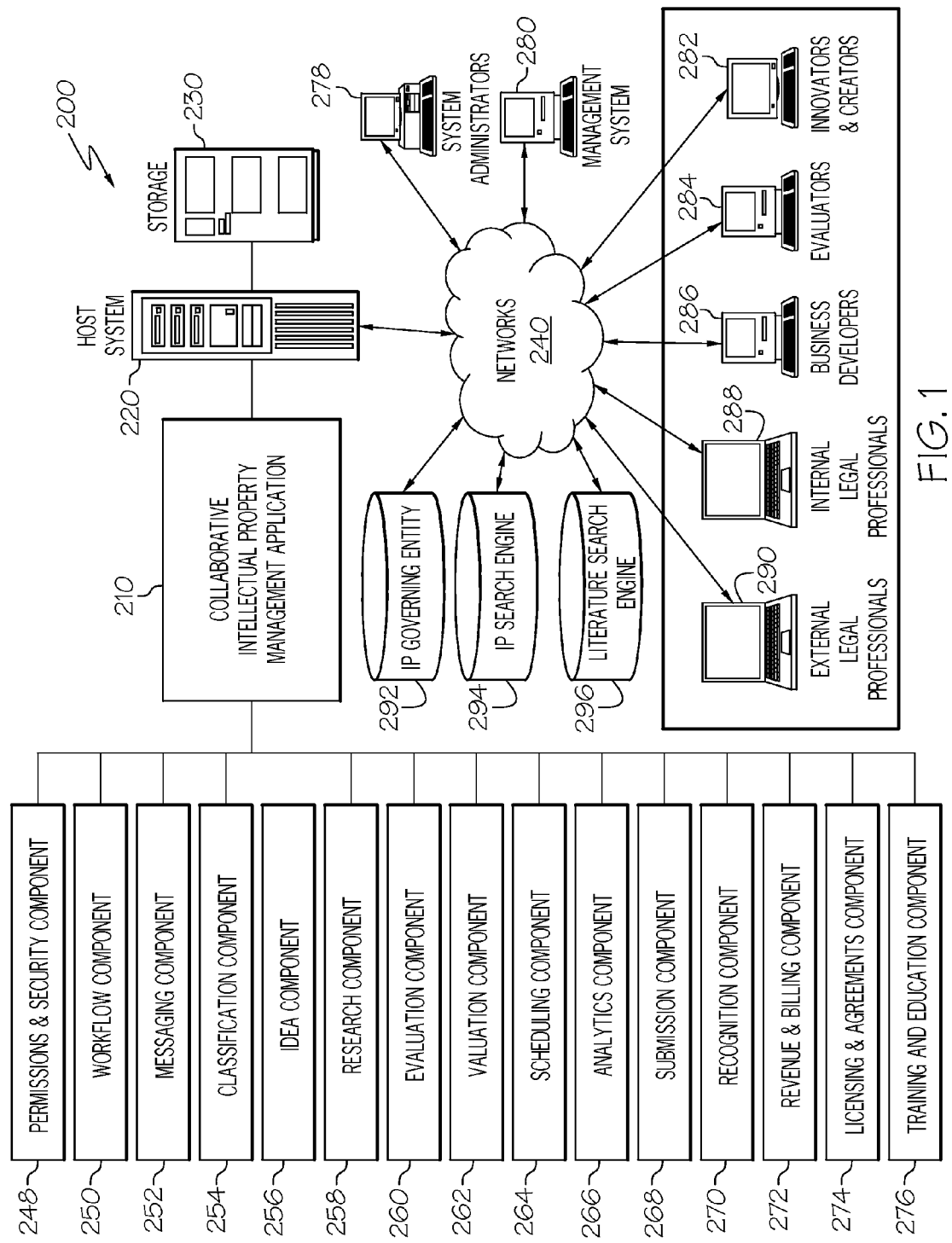
FIG. 1 is a block diagram of a system upon which collaborative intellectual property management services may be implemented in accordance with exemplary embodiments.

The detailed description explains the preferred embodiments of the invention, together with advantages and features, by way of example with reference to the drawings.

DETAILED DESCRIPTION OF THE INVENTION

Exemplary embodiments include a method, system and computer program product for implementing collaborative and integrated intellectual property management services. The collaborative and integrated intellectual property management services may be used by creators of intellectual property, evaluators, business developers, and legal professionals to manage the creation, submission, application, prosecution, compensation, commercialization and management of intellectual property in an end-to-end intellectual property management model.

The collaborative and integrated intellectual property management services combine a well defined set of system architecture and program products to rapidly develop and drive quality intellectual property submissions to a successful granting of governmental approvals, to include patents, trademarks, and copyrights, license agreements, and the like. One value proposition of the disclosed collaborative and integrated intellectual property management system is to reduce the cycle time from intellectual property creation to approval, improve the quality of intellectual property submissions, conduct portfolio management, perform valuation management functions, ensure the protection or enforcement "end state" is kept in focus, and managerial, technical, business development and legal oversight is maintained over each phase of the intellectual property process.

For purposes of illustration, the collaborative and integrated intellectual property management process will be described with respect to a business enterprise (also referred to herein as "organization" and "entity"). However, it will be understood by those skilled in the art that other types of organizations, such as military, government, international organization, non-governmental organization, non-profit organization, educational institution, research institution, and the like may implement the invention by modifying one or more of the items within the invention.

Various terminology, as provided herein, is defined below for clarification:

Intellectual Property (IP). A collection of patents, trademarks, copyrights, licenses, trade secrets, primary research, books, or published articles.

Patent. A government official grant or privilege to an inventor or consignee for a stated period of time, conferring the exclusive use, manufacture and sale of an invention.

Trademark. The governmental registration of a name, symbol, figure, letter, word, or mark adopted by an organization for exclusive use to distinguish their good and/or service from others.

Copyright. The exclusive right granted by law for a certain number of years to make and dispose of a literary, musical or artistic work.

Trade Secret. A process, information, design, device, composition, technique and/or formulae that is not generally known, which can be kept secret for more than a specific period of time and its owner takes substantial efforts to keep the knowledge secret. Normally a trade secret should be kept secret for a period longer than the protection afforded by a patent.

Published Article. A factual piece of writing in a journal or publication on a specific topic or item of interest.

License. Formal permission from a constituted authority to do a specific thing. The constituted authority may be a governmental entity or an organization. The permission provides the legal right or freedom to use intellectual property by another.

Cross License. Formal permission between two or more organizations to use one another's intellectual property.

Primary research. A specific instance of systematic inquiry or investigation into a field of endeavor to discover facts and derive theories.

Book. A printed composition on consecutive sheets bound together in a volume.

Intellectual Property Quality. Intellectual property quality consists of complete and thorough research of the subject to ensure novelty and non-obviousness combined with a comprehensive and full disclosure that explains how the intellectual property can be produced and operated without any material aid.

Classification. Classification is a scheme used to organize and index the technical content of intellectual property so that classification associated with a specific topic or in a given area of technology can provide easy identification and retrieval, promote discovery and usage of information, and recognize or identify potentially duplicate information even if the text is not identical, for example, key words, phases in titles, abstract, indices, text and the like. To further enhance identification and retrieval, this should also include intersections of multiple hierarchies, to extend or broaden the potential coverage of the intellectual property.

Portfolio Management. Portfolio management refers to the way an organization selects and prioritizes intellectual property groups to achieve its goals, especially maximizing the long-term value of the various forms of intellectual property. The objectives are to implement a strategy and achieve a balance within the different types of owned intellectual property. The nature of a balanced portfolio depends on the organization and its strategic objectives. An overall view of the portfolio is essential to organization's ability to determine whether or not its intellectual property are appropriately targeted to achieve the objectives (revenue, profits, growth, market coverage, and the like) stated in its strategic plans.

Valuation Management. Valuation management consists of the application of the right balance of tools, processes and knowledge, as well as periodic checks, for example, by human and machine enhanced techniques, of each intellectual property type and the overall portfolio, versus the potential market for the protected properties. Intellectual property information and any opportunities that are identified as a result of this systematic analysis of available information and approach, must get captured such that information is easily recognizable and quickly retrievable, and executed in such a way as to be able to enhance licensing revenue, protect the organization's operations and align with the strategy. Other potential outcomes could also include identifying intellectual property that should be sold, integrating with other solution offerings, developing emerging business opportunities, termination, keeping as a Trade Secret, and the like.

Project Management. The application of knowledge, skills, tools and techniques to a broad range of activities to meet the requirements of the particular project. Project management knowledge and practices are best described in terms of their component processes. These processes can be placed into five process groups (initiating, planning, executing, controlling and closing) and nine knowledge areas (integration, scope, time, cost, quality, human resource, communications, risk and procurement).

Collaborative. The process of willingly working with others in a cooperative fashion.

Legal Professional. A legal professional includes lawyers and certified paralegals supported by staff personnel such as administrative assistants, technical writers and draftsmen. The professionals may be internal or external to the organization.

Governing Entity. A national or international intellectual property organization or agency empowered through legislation to examine and authorize intellectual property rights. The sovereign government or international organization establishing the governing entity will establish the format, schedule and fees for requesting intellectual property rights based on regulations, treaties or conventions. Examples are the Paris Convention of 1883, European Patent Convention (EPC), and the Patent Cooperation Treaty (PCT) of 1978. The United States has entered into bilateral patent treaties with Taiwan, Thailand, and India.

User. Users of the method, system architecture and program products are innovators, creators, evaluators, business developers, and legal professionals (internal and external).

The collaborative and integrated intellectual property management services exert a normalizing effect on all participants within the intellectual property process. These services further permit creators and innovators to energize the intellectual property process. Management, technical, business development and legal representation direct and support the intellectual property process. The method and system architecture ensures that responsibilities are clearly delineated and accountability is maintained throughout the entire intellectual property process. The method creates the structure or common creative literacy for intellectual property work streams and management systems whilst allowing the talent pool of creators and innovators to quickly interact with colleagues, business developers and legal professionals. The objective is not to mass customize intellectual property. The goals are to assist self-organizing groups of technical innovators or creative contributors to produce intellectual property faster with improved quality in close collaboration with their management team and legal professionals, increase the commercialization potential of the intellectual property, and go to market before the competition. The use of project management techniques are applied to ensure adequate resources are applied and all milestones are met. The lack of intellectual property quality in existing IP systems can in part be attributed to a lack of structure, guidance and directions for the innovators and creators.

The collaborative and integrated intellectual property management services provide improved collaboration, integrated processes, mandated structure and better quality submissions, which can decrease intellectual property process cycle times (creation to implementation, maintenance and enforcement). These improvements may serve as an economic engine for the organization, improve intellectual property marketing, increase the commercialization potential, be first to market, increase market share, and accelerate future innovation. The sharing and collaboration of intellectual property development starts at the discovery or creation phase and concludes when the intellectual property's protections cease to exist. The process model of intellectual property phases and requisite collaboration is identified in a diagram shown in FIG. 2. A block diagram 200 of FIG. 1 depicts a system for implementing the process model phases of FIG. 2 and integrates the applicable components (e.g., 248-276) of the system architecture to the appropriate phases 120-180 as will be described further herein.

These phases 120-180 may be defined via the collaborative integrated intellectual property management services (e.g., via a user interface of a collaborative intellectual property management application 210 described further herein). These phases 120-180 may be defined to meet the particular needs of the entity implementing the collaborative integrated intellectual property management services. As these phases 120-180 interact with one or more components 248-276, a responsible member or team (e.g., a management system 280 of FIG. 1) may further define the processes described with respect to phases 120-180 via corresponding components 248-276 (also referred to herein as "task-based components"), including customizing workflow, messaging, and substantive procedures relating to underlying IP matters. Thus, various components 248-276 may be configured as customized tasks that are performed in a specified sequence by assigned or designated individuals (also referred to herein as roles). In addition, resources and the aforementioned roles may be defined for each of the phases and components via the collaborative integrated intellectual property management services described herein. For example, resources may include various governing entities, data repositories, and training sources. Roles may be determined according to specialized skills and task-based processes that are associated with the roles (e.g., tasks related to legal matters may be assigned to roles associated with a legal department). These task-based components, roles, and resources are described further in FIG. 1.

Turning now to FIG. 1, a system for implementing the collaborative intellectual property management services will now be described in accordance with exemplary embodiments. The system 200 of FIG. 1 includes a management system 280 in communication with a host system 220 and network entities over one or more networks 240. The management system 280 will be described further in FIG. 2.

Host system 220 executes a collaborative intellectual property management application 210 for providing the collaborative and integrated intellectual property management services described herein. Host system 220 is in communication with client systems 278-290 and external applications 292-296 via one or more networks 240. Host system 220 is also in communication with a storage system 230. The collaborative intellectual property management application 210 implements the components 248-276, e.g., as separate application modules, as described herein. In addition, the application 210 may provide a user interface accessible by users of the application 210 (e.g., client systems 276-290).

The host system 220 may be implemented using one of more servers operating in response to a computer program stored in a storage medium accessible by such servers. The host system 220 may operate as a network server (e.g., a web server) to communicate with the client systems 278-290 or external applications 292-296. Host system 220 handles sending and receiving information to and from client systems 278-290 and external applications 292-296, and performs associated tasks. In doing so, host system 220 executes various applications typically found in an organization.

Host system 220 may also operate as an application server. Host system 220 executes one or more computer programs to implement the system processes and related functions. As previously described, it is understood that separate servers may be utilized to implement the network server functions and the application server functions. Alternatively, the network server, the firewall, and the application server may be implemented by a single server executing computer programs to perform the requisite functions. For example, host system 220 may include, but is not limited to, an IBM® System, such as System I™, System P™, System X™ or System Z™, as well as any other suitable commercially-available computer systems depending on the scope of the implementation. The server may execute web server software designed to accommodate various forms of communications, including voice, video, and text typically utilized by large business entities. Any web server software or similar program that handles general communications protocols and transport layer activities could be used as appropriate for the network protocol in use. For purposes of illustration, server is running IBM's Lotus Domino™ and Lotus Notes™ as its groupware applications software; however, any compatible e-mail-integrated, web-enabled collaborative software could be used.

Host system 220 is in communication with a storage system 230. Storage system 230 may be implemented using a variety of devices for storing electronic information. It is understood that the storage system 230 may be implemented using memory contained in the host system 220 or it may be a separate physical device. The storage system 230 is logically addressable as a consolidated data source across a distributed environment that includes networks 240. Information stored in the storage system 230 may be retrieved and manipulated via the host system 220 by a database manager or data mining software. The storage system 230 includes a data repository containing documents, data, web pages, images, multimedia, etc. Further, storage system 230 stores configuration files (also referred to herein as page tokens). In an exemplary embodiment, the host system 220 operates as a database server and coordinates access to application data including data stored within the storage system 230.

Storage system 230 may comprise any form of mass storage device configured to read and write database-type data maintained in a file store (e.g., a magnetic disk data storage device). The storage system 230 may range from a single hard disk drive on a personal computer to a large enterprise storage system, i.e., IBM's Shark™. Of course, it will be appreciated that the storage system 230 may be one that consists of multiple disk subsystems which may be geographically dispersed and coupled via network architecture. In addition, there is no positive requirement that the storage system 230 be maintained in one facility; to the contrary, the volume of information stored therein may dictate geographical dispersion and the like. The implementation of local and wide-area database management systems to achieve the functionality of the storage system 230 will be readily understood by those skilled in the art. For purposes of illustration, the database manager may be IBM's DB/2® software. The storage system 230 provides a repository for a library of documents and data that are created and utilized by the process as described herein.

Networks 240 may comprise any type or combination of known networks including, but not limited to, a Local Area Network (LAN), a Wide Area Network (WAN), a global network (e.g., Internet), a Virtual Private Network (VPN), an intranet, or other network configuration known in the art. These networks may be implemented using a wireless network or may be physically connected to each other in a state of the art configuration. One or more of the client systems 278-290 or external applications 292-296 may be coupled to the host system 220 through multiple networks (e.g., intranet and Internet) so that not all clients systems 278-290 or external applications 292-296 are coupled to host system 220 through the same network.

One or more of client systems 278-290, external applications 292-296 and the host system 220 may be connected to the networks 240 in a wireless fashion. For example, one or more client systems 278-290 or external applications 292-296 may execute a user interface application (e.g., a web browser) to contact the host system 220 through the networks 240, while another client system is directly connected to the host system 220. Also, one or more client systems 278-290 may be connected directly (i.e., not through the networks 240) to the host system 220 and the host system may be connected directly to or contains storage device 230. Further, the networks 240 may include wireless connections, radio based communications, telephony based communications, personal digital assistants (PDAs), and other network-based communications. Secure Socket Layer (SSL encryption) software may be used to control access to host system, limiting permissions to network users, such as remote client systems or vendor systems, who have proper authorization.

In exemplary embodiments, collaborative intellectual property management application 210 includes, or is in communication with, various components These components include permissions & security 248, workflow 250, messaging 252, classification 254, idea 256, research 258, evaluation 260, valuation 262, scheduling 264, analytics 266, submission 268, recognition 270, revenue & billing 272, licensing & agreements 274, and training and education 276. These components, in conjunction with the other aspects of the system 200 provide an overall system architecture for implementing the collaborative and integrated intellectual property management services. Those skilled in the art will appreciate that these components may be arranged differently depending on the implementation, or that the implementation could use a phased approach depending on user needs and affordability. In accordance with exemplary embodiments, a Service Oriented Architecture (SOA) approach may be used to implement the collaborative and integrated intellectual property management services described herein. The SOA permits the ready integration of components (e.g., components 248 through 276) with one another and with the collaborative intellectual property management application 210. One value of this type of system architecture is the ready adoption of new and improved components (e.g., 248 through 276), which may be internally or externally developed, industry standards, and the like. This adaptable systems architecture allows for continuous improvements at low cost for adoption and faster integration. For, example, as valuation modeling improves over time, the valuation component 262 could be replaced with the latest version very rapidly with little programming effort. Additionally, the SOA architecture lends itself to Component Business Modeling (CBM). In exemplary embodiments, the collaborative intellectual property management application 210 is managed by a delegated team from the internal legal professionals 288 of the entity of system 200. With the exception of the permissions & security 248 component, the remaining components 250 through 276 may be solely managed by the delegated team from the internal legal professionals 288. These components will now be described in accordance with exemplary embodiments.

Permissions & security component 248 may be implemented as an automated system that manages user log in and password entry into the collaborative intellectual property management application 210. Permissions component 248 provides protection to key information and the appropriate entitled data to specific users. In exemplary embodiments, component 248 is managed by system administrators 278 in conjunction with the delegated team from the internal legal professionals 288. For example, Web Identity™ could be used to implement this component.

In exemplary embodiments, workflow component 250 manages each intellectual property asset or submission through the process phases 120 through 180 using project management techniques and appropriate messaging to individuals and/or workgroups (e.g., client systems 282-290), management system 280, and the like. The workflow component 250 may be configured to sense the components of the collaborative intellectual property management application 210 for applicable workflow templates and milestone discrepancies to send alerts, warnings, and messages to the various individuals or workgroups (e.g., client systems 282 through 290), analytics component 266, and management system 280 for timely and complete execution.

In exemplary embodiments, workflow component 250 is configured to support all phases of the process (120-180), create project plans, provide a sense and respond capability, and prompt users to act in a timely fashion. Additionally, work-in-progress notifications from the messaging component 252 may be displayed to the users (e.g., client systems 280-290), which indicate the next steps or tasks required, related due dates, etc. The workflow component 250 is configured to choreograph the events and activities of the various other components and users described herein. The workflow component 250 may also integrate applicable training and education materials to the users (e.g., client systems 280-290) based on their experience from the training and education component 276 as well as at the appropriate phases (120-180) or process steps therein.

For example, IBM's® WebSphere Business Integrator™ (WBI) workflow modeling and monitoring software could be used to implement this component of the invention and enhance the sense and response capabilities indicated herein. For example, filing a patent with the United States Patent and Trademark Office (USPTO) may trigger a series of subsequent events of filing for patents or provisional applications in other countries based on elapsed time requirements and type of convention, treaty or regulation. Additionally, for example, IBM's® Lotus Domino and Notes™ may provide integrated messaging technology necessary to communicate tasks and dates to users of clients systems 280-290.

An illustration of the workflow is described in FIG. 5, which could be used within a process modeling tool. The combination of the workflow component 250 with the various collaborative intellectual property management application 210 components (252 through 276) with their users (e.g., clients systems 280 through 290) provide comprehensive integration of disparate applications or elements to achieve goals of timeliness, quality, and efficiency.

In exemplary embodiments, classification component 254 provides a taxonomy for classifying intellectual property elements, which may include cross-references to classification regimes of the various intellectual properties' governing entities. The classification component 254 may be used by innovators & creators 282, evaluators 284, business developers 286 and legal professionals (288-290). The classification component 254 may be used by the idea 256, research 258, evaluation 260, valuation 262, scheduling 264, and analytics 266 components. In exemplary embodiments, the classification component 254 supports all phases (120-180) of the collaborative integrated intellectual property management processes. One value of the classification component 254 is to provide a schema for indexing and categorizing intellectual property which can be effectively and thoroughly researched, evaluated, and analyzed. The research component 258 leverages the classification component 254 in locating relevant and related information from internal components as well as external applications (292-296) and automatically posts this information to the idea component 256. This may be considered a prior art builder of information. The users of client systems 282-290 may delete this information if it is found not to be relevant. The classification component 254 facilitates the binding of the aforementioned components together in an efficient and effective manner, and to achieve the goals of timeliness and quality.

Figure 4:
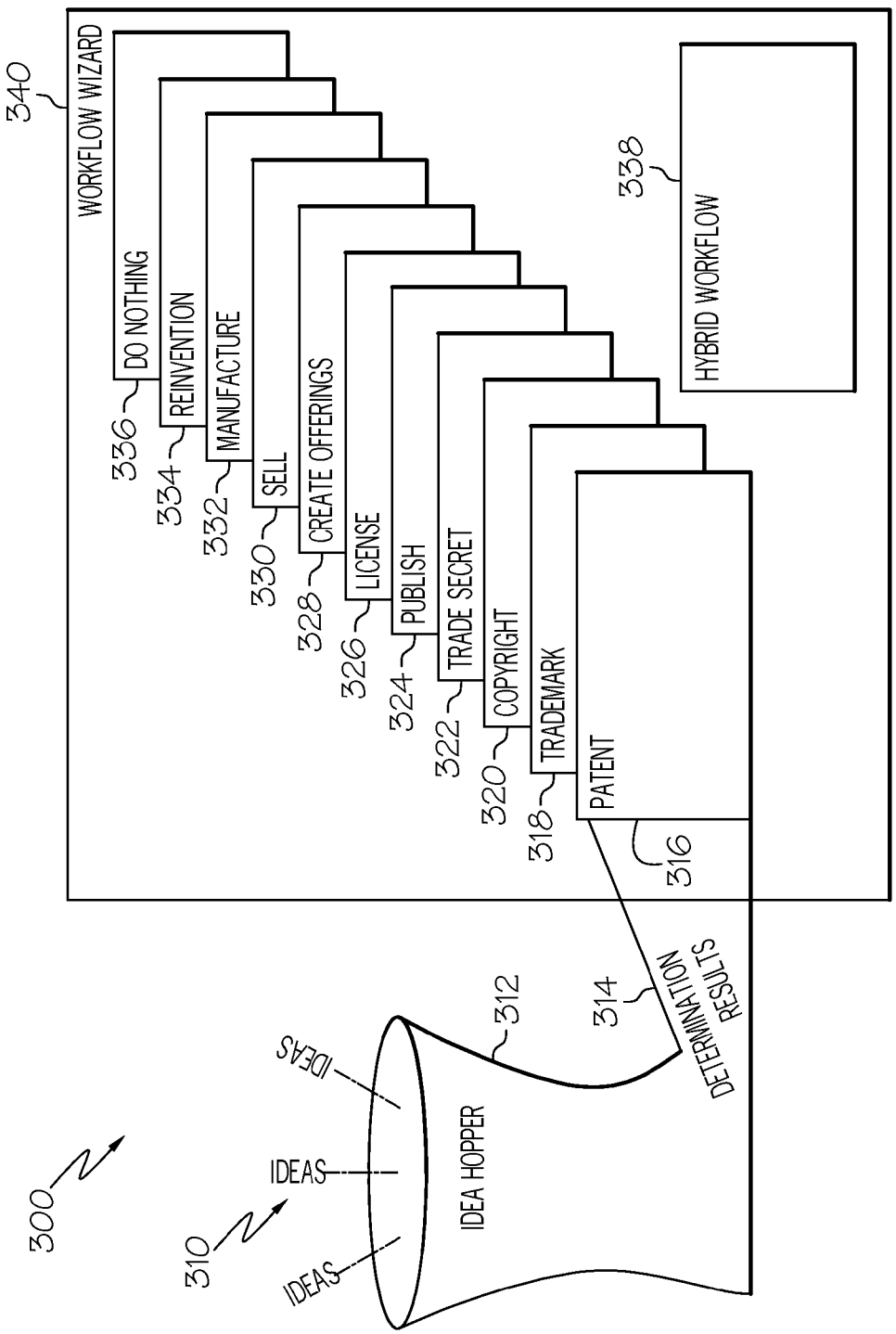
FIG. 4 is a process diagram describing the creation and evaluation phases of the process architecture shown in FIG. 2 in exemplary embodiments.

Idea component 256 may include a database repository containing the applicable elements for documenting the creation of an intellectual property. The format of the database repository may depend on the type of intellectual property and the governing entity's requirements. The innovators & creators 282 enter their intellectual property, to include narratives, graphics, artifacts, and the like into the component 256 and ensure the applicable elements are completed in a timely fashion. The idea component 256 supports the creation phase 120 of the process. Additionally, this component helps to establish "first to invent" status (e.g., for the United States and Philippines). Key questions may identify any potential legal bar dates that must be met to successfully submit and defend an intellectual property. Legal professionals (288-290) may also enter amendments, revise narratives and graphics to conform to legal standards, and append additional artifacts based on their review and research. In exemplary embodiments, the creation 120 phase is a collaborative effort between the innovators & creators 282, business developers 286 and legal professionals (288-290) up to the beginning of the submission 140 phase. FIG. 4 illustrates the possible outcomes of a series of interactive questions and decision trees which is fed back to the workflow component 250 to select the applicable workflow template.

Research component 258 may be an internal database containing research elements such as prior art, technical literature, and the like that may be reviewed by users of client systems 280-290. In some cases, the internal research capability may be insufficient. The user may then be linked to external databases such as the IP governing entity 292 (e.g., USPTO, European Patent Office, and the like), IP search engine 292 (e.g., Delphion™ and the like), and literature search engine 296 (e.g., Proquest™, Google™, inventor resources and associations, and the like) via the collaborative integrated intellectual property management processes. In the conduct of research, the classification component 254 may be used for cross-referencing and facilitating the necessary searches. In exemplary embodiments, the research component 258 primarily supports the creation 120, evaluation 130 and compensation, licensing & enforcement 170 phases, and may be situationally used in the other phases of the process.

In exemplary embodiments, evaluation component 260 may include one or more repositories for various evaluations, technical, commercial and/or legal information. Situationally dependent, this component 260 may not be used for all intellectual property submissions. The results of the independent evaluations are maintained within this component 260. In some cases, the evaluation may require the innovators & creators 282 to update, improve or revise their intellectual property. The evaluation phase 130 is one technique to improve the quality of intellectual property submissions. The evaluators 284 update this component 260, and it supports the evaluation phase 130 and the review & approval phase 150 of the process.

In exemplary embodiments, valuation component 262 may be used to assist in the evaluation 130, review & approval 150, maintenance 160, compensation, licensing & enforcement 170, and prototyping and implementation 180 phases to determine the potential value of a specific or group of intellectual property. This component may use statistical, algorithmic, raw scoring, and the like mathematical treatments in performing an evaluation. This determination is one input in making a decision to proceed to the submission phase 140. The valuation component 262 assists investment decisions, licensing and agreement component 274 programs, appraisals, transfer pricing, mediation, settlement, and the like. Internal legal professionals 288 may use this component, to include forecasting for the revenue & billing component 272.

In exemplary embodiments, scheduling component 264 may be used to schedule and allocate resources in the evaluation 130, submission 140, and review & approval 150 phases. Specifically, the component 264 uses supply- and skill-based information to determine the availability of evaluators 284 and legal professionals (288-290) based on the classification component 254 and bar dates, to include which intellectual property submissions should be supported by external legal professionals 290 based on availability, performance, knowledge, bar dates, legal requirements, and the like. The automated scheduling of resources to support the collaborative intellectual property management system may be based upon demand and supply planning principles. Additionally, this capability provides appropriate work balance for evaluators 284 and legal professionals (288-290). This may reduce the critical path barriers to timely execution of the intellectual property work processes. When imbalances in work efforts are identified by the workflow 250 or analytics 266 components, the scheduling component 264 may be directed, either automatically or manually, to perform an optimal improvement routine to assign or reassign resources based on the availability of personnel, business needs and legal requirements. The automated scheduling based on expertise and availability supplants the current methods of manual scheduling or automated direction based on artificial classification schemas.

In exemplary embodiments, analytics component 266 produces reports for the management system 280. These reports may include intellectual property portfolio valuation from the valuation component 262. A specific function may be to evaluate draft claims of proposed intellectual property elements to ensure consistency and coverage with the narrative for the legal professionals (288-290). Additionally, the cycle times for intellectual property processes may be analyzed from the templates contained within the workflow component 250, to include adherence to bar dates (submission phase 140), requests for office actions (review & approval phase 150), meeting maintenance fee dates (maintenance phase 160), and the like. This type of information identifies any potential areas to improve the timely processing of intellectual property requirements, establish case load requirements, benchmark processes for comparative analyses, update the workflow 250 and scheduling 264 components with planning data, and improve quality of intellectual property submissions. Analysis of billable hours from the revenue & billing component 272 by external legal professionals 290 may be used to highlight efficiencies for recurring use and inefficiencies for corrective action. Analysis of revenue by innovators & creators 282 may point to additional rewards for high performing intellectual property and quality issues for low performing intellectual property. Therefore, the output of the analytics component 266 may be represented in a management system dashboard with measures, volumes, cycle times, exceptions, quality factors, office actions, litigation, wins and losses, user training and education compliance based on user profiles (novice, expert, and the like), licensing revenue, awards, billable hours, and the like. The robust and comprehensive set of analytics may be a key driver of optimum performance leveraged by the management system 280 and advances to the state of the art through new uses.

Workflow 250 and analytics 266 components may benefit from sense and respond processes and technological platforms. These processes and technologies should provide headlights to impending problems such as not meeting stipulated legal time frames, insufficient staffing, and the like.

In exemplary embodiments, submission component 268 may include a repository for all of the filing intellectual property documentation to include powers of attorney, forms, applicable fees, and the like. The submission component 268 may be used by either the internal legal professionals 288 or external legal professionals 290 depending on the arrangement between the two groups. This component is important for those governing entities where "first to file" status determines the awarding of intellectual property rights. The submission component 268 supports the submission 140 phase of the process.

In exemplary embodiments, recognition component 270 may include a repository for managing financial and other tangible rewards for the intellectual property program. A regime of incentives may be documented in favor of the innovators & creators 282. This information may be provided to the revenue & billing component 272 to ensure any expenses are levied against the appropriate accounting cost center. The recognition component 270 supports the submission 140 and compensation, licensing & enforcement 170 phases of the process.

In exemplary embodiments, revenue & billing component 272 provides for the collection of compensation for licenses, royalties, other agreements, and the like, and the billing for external legal professionals, applicable intellectual property fees, recognition component 270 rewards, and the like. The revenue & billing component 272 supports the compensation, licensing & enforcement 170 phase of the process.

In exemplary embodiments, licensing & agreements component 274 may include a repository of all license, cross-license, royalty, or other agreements. For those legal agreements that involve the collection of revenue, that information may be provided to the revenue & billing component 272 for appropriate action. The licensing & agreements component 274 supports the compensation, licensing & enforcement 170 phase of the process.

In exemplary embodiments, training and education component 276 may be managed by the delegated team from the internal legal professionals 288 and supported by the systems administrator 278 to provide readily available assistance for routine issues and questions posed by users of client systems 280-290. Training and education component 276 may be particularly useful for first time users with respect to the various requirements and benefits of the process architecture 100 of FIG. 2 and the system 200 of FIG. 1. The training and education component 276 may be comprised of a self-guided tutorial, methods of conducting research, a robust education of lessons depending on the type of intellectual property and degree of experience of the users of client systems 282-290, and the like. In the case of the latter, a decision tree may be used to determine which educational opportunities are mandatory or optional for the specific innovator & creator 282, and would link the education to specific phases of the intellectual property process architecture 100 and workflow 250. A record for each user may be maintained to ascertain the degree of training and education received, as well as a score as to their experience level, that is novice, expert, and the like. The management system 280 may also flag a user for remedial training and education based on quality issues, administrative duties, and the like. The training and education component 276 may be fully integrated into the intellectual management processes via the workflow component 250.

Client systems 278-290 may comprise general-purpose computer devices that allow systems to connect to the networks 240 and host system 220. Client systems 278-290 may access host system 220 via web browsers located therein. Individual client systems are described below, and may include suitable computer systems. Individuals and teams (e.g., users of client systems 278-290) involved in the collaborative intellectual program management application 210 and components (248-276) perform specific roles throughout the described process. They are also in communication with one another via the respective client systems 278-290 as will be described further herein.

In exemplary embodiments, system administrator 278 refers to a client system operated to manage the performance, operation, and maintenance of the host system 220, storage system 230, and networks 240 identified in the foregoing discussion. The system administrator manages the host system 220, storage 230, and networks 240, and applicable applications and components in close coordination with the delegated team from the internal legal professionals 288. For those applications that require dedicated support around the clock and across the globe, there may be more than one system administrator. Additionally, the degree of complexity of the application 210 and its associated components (248-276), host system 220, storage system 230 and networks 240, may require layered support normally associated with a help desk with various degree of technical support, e.g., Level 1, Level 2, and the like.

Management system 280 may be tasked with overseeing the functioning of the innovators & creators 282, evaluators 284, business developers 286, and legal professionals (288-290) to ensure the method, system architecture, program products, and results are providing the requisite collaborative intellectual property management. Additionally, the management system 280 identifies the specific roles and responsibilities of the innovators & creators 282, evaluators 284, business developers 286, and legal professionals (288-290) based on the scope of a desired implementation. In exemplary embodiments, the management system 280 determines the strategy, sets the objectives and targets, and provides governance (e.g., prioritizing efforts, assigning work, creating action plans, reviewing analyses, allocating resources, evaluating results, adjudicating a grievance procedure to address unfair or incorrect decisions, reviewing the output of the analytics component 266, and the like). The management system 280 is responsible for the effective and efficient processes with the process architecture 100 phases that are specified in FIG. 2 and ensuring timely feedback to innovators & creators 282, evaluators 284, business developers 286, and legal professionals (288 and 290).

In exemplary embodiments, innovators & creators 282 initiate intellectual property development and may be involved in all phases of intellectual property (120 through 180) to varying degrees depending on the phase and specific situational requirements. They may be primarily responsible for disclosing the intellectual property in the idea component 256, self-identify the type of intellectual property using the classification component 254, and may conduct information gathering from the research component 258, IP search engine 294, and literature search engine 296.

In exemplary embodiments, evaluators 284 may conduct intellectual property evaluations depending on their domain expertise, that is, commercial, technical, legal, and the like. Their comments may be documented in the evaluation component 260. The evaluators may be standing teams or drawn together ad hoc. In either case, the scheduling component 264 is tasked with ensuring the right type of individuals and technical skills are available to expeditiously evaluate the intellectual property that has been created. Evaluators play a role in determining novelty, operability, non-obviousness, opportunity for commercialization and intellectual property quality. Proper evaluations are important in subsequent phases, especially for revenue generation and possibly litigation. Like innovators & creators 282, evaluators 284 may conduct information gathering from the research component 258, IP search engine 294, and literature search engine 296.

In exemplary embodiments, business developers 286 provide the acumen to determine the portfolio and valuation management of the intellectual property, to include the marketing strategies and commercialization potential. In exemplary embodiments, business developers 286 are thoroughly engaged in the collaborative and integrated intellectual property management process to ensure there is sufficient effort to integrate the intellectual property into products, services, offerings, and the like, assist in overcoming the issue of obviousness by implementation, generate applicable revenue, and provide innovation to client engagements. Business developers 286 may leverage the classification 254, valuation 262 and analytics 266 components to determine current and future opportunities for commercial exploitation. The combination of elements within the intellectual property portfolio could be used to create new business offerings. Additionally, when specific business opportunities arise, supporting intellectual property could be rapidly located to support developmental, marketing, sales and consulting efforts.

In exemplary embodiments, internal legal professionals 288 operate the collaborative intellectual property management application 210 and associated components, specifically 250 through 276. A delegated team may perform key tasks in managing these components, generally a support staff under the direction of a senior legal professional.

In exemplary embodiments, external legal professionals 290 may be employed due to their subject matter expertise in the form of the intellectual property. These professionals may be involved in evaluations, valuations, submissions, licensing, prosecutions, and the like. If employed by the entity of system 200, their capabilities may be integrated into the collaborative intellectual property management application 210 via the permissions & security component 248. The permissions & security component 248 determines which components of the collaborative intellectual property management application 210 they are allowed to use and what type of alerts and notifications from the workflow and messaging components 250 and 252, respectively, they will receive.

In exemplary embodiments IP governing entity 292 database and repository provides information concerning the activities of the governing entity, and as a means to electronically receive filings from the submission component 268.

In exemplary embodiments, IP search engine 294 database and repository provides the means to research intellectual property submissions in one or more applicable IP governing entity's databases and repositories 292. The research component 258 may automatically invoke connections to the IP search engine 294, and may narrow the scope of the search depending on the recommended cross references from the classification component 254.

Literature search engine 296 database and repository provides the means to research technical and non-technical literature to assist in determining the state of the art. The research component 258 may automatically invoke connections to the literature search engine 296, and may narrow the scope of the search depending on the recommended cross references from the classification component 254.

It will be appreciated by those skilled in the art that combination of the classification 254, idea 256 and research 258 components integrated through the collaborative intellectual property management application 210 to the IP governing entity 292, IP search engine 294, literature search engine 296, and the like provides an automated methodology for conducting intellectual property research and pushing that information to the innovators & creators 282 and evaluators 284. In the current state of the art, innovators and creators are expected to laboriously conduct manual technical and business searches, to include library visits. The collaborative and integrated intellectual property management services provide a solution in which, based on the classification codes or key words inserted by innovators & creators 282 and evaluators 284, an automated search is conducted, compiled in a structured way by the research component 258, and deposited in the idea 256 and evaluation 260 components. As a result, research information is 'pushed' to innovators & creators 282 and evaluators 284 instead of traditional pull methods. An event driven push may be implemented using a workflow-controlled process. This integration facilitates productivity enhancement and ensures the completeness of research. If the research documents provided by IP governing entity 292, IP search engine 294, literature search engine 296, and the like are not applicable, they may be deleted from the idea 256 and evaluation 260 components. In many ways, the research component 258 may be likened to a personal research assistant for innovators & creators 282, evaluators 284, business developers 286, and legal professionals 288-290, enhancing their personal capabilities and allowing them to focus on their strengths. This capability may provide much reassurance to legal professionals 288-290 during the evaluation 130, submission 140, and review & approval 150 phases.

Additionally, business developers 286 may be able to use this capability when creating offerings or supporting consulting efforts based on intellectual property. Therefore, one value of this capability is the thoroughness, completeness and timeliness of the research. For example, the innovators and creators 282 may input their idea in the afternoon and during the evening hours when there is more available computing power; the research component 258 may orchestrate the research effort and place the information in the idea component 256 by the next morning. The research component 258 may obtain cross-reference data from the classification component 254 to facilitate the research. The research component 258 may be an additional example of SOA influence; that is, the workflow component 250 "calls" the research component 258 to conduct the requested search, and returns the output to the idea component 256 in a specified format. The format may vary based on the nature of the data so that the research component 258 might opt to use different software (e.g., Excel™, Word™, etc.) to display the returned data depending on the type of data to be displayed.

Figure 2:
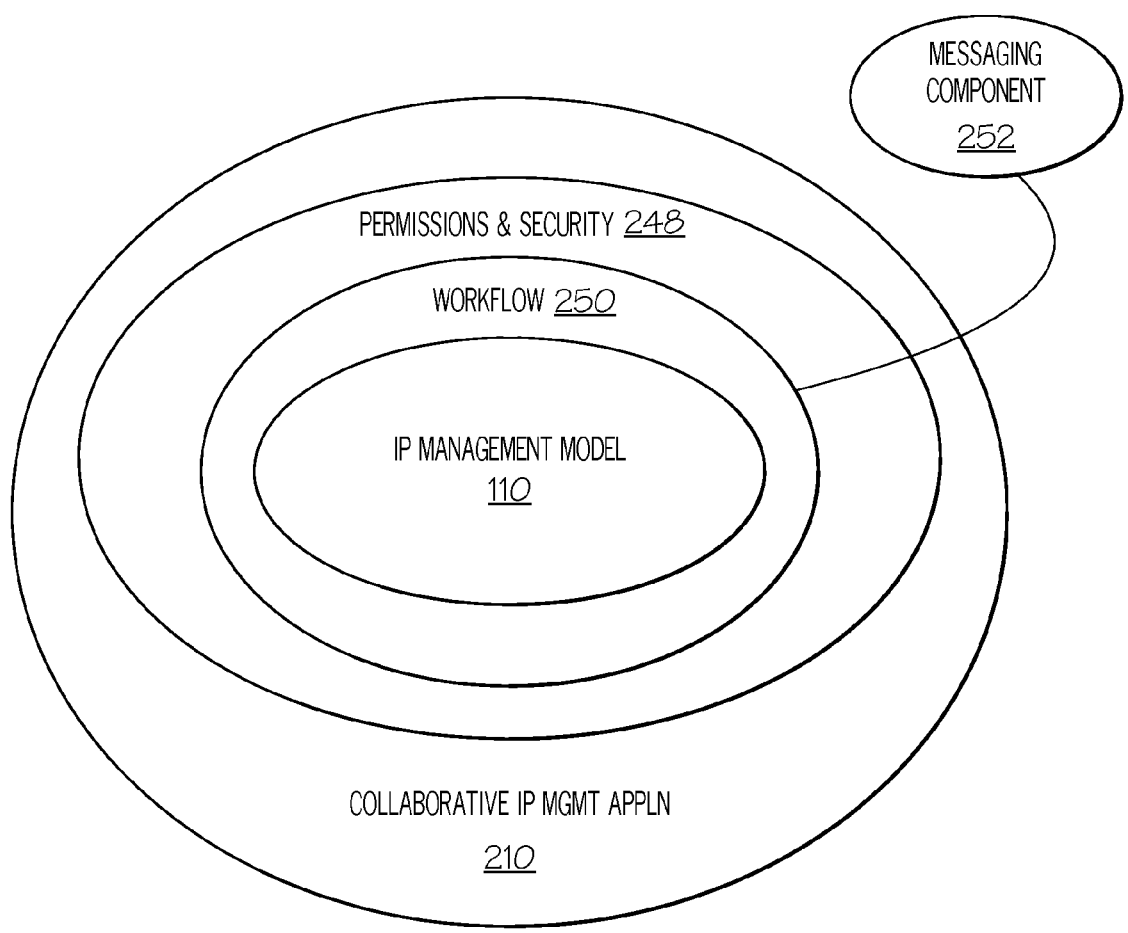
FIG. 2 is a diagram depicting an exemplary embodiment of a process architecture used in implementing the collaborative intellectual property management services.
Figure 3:
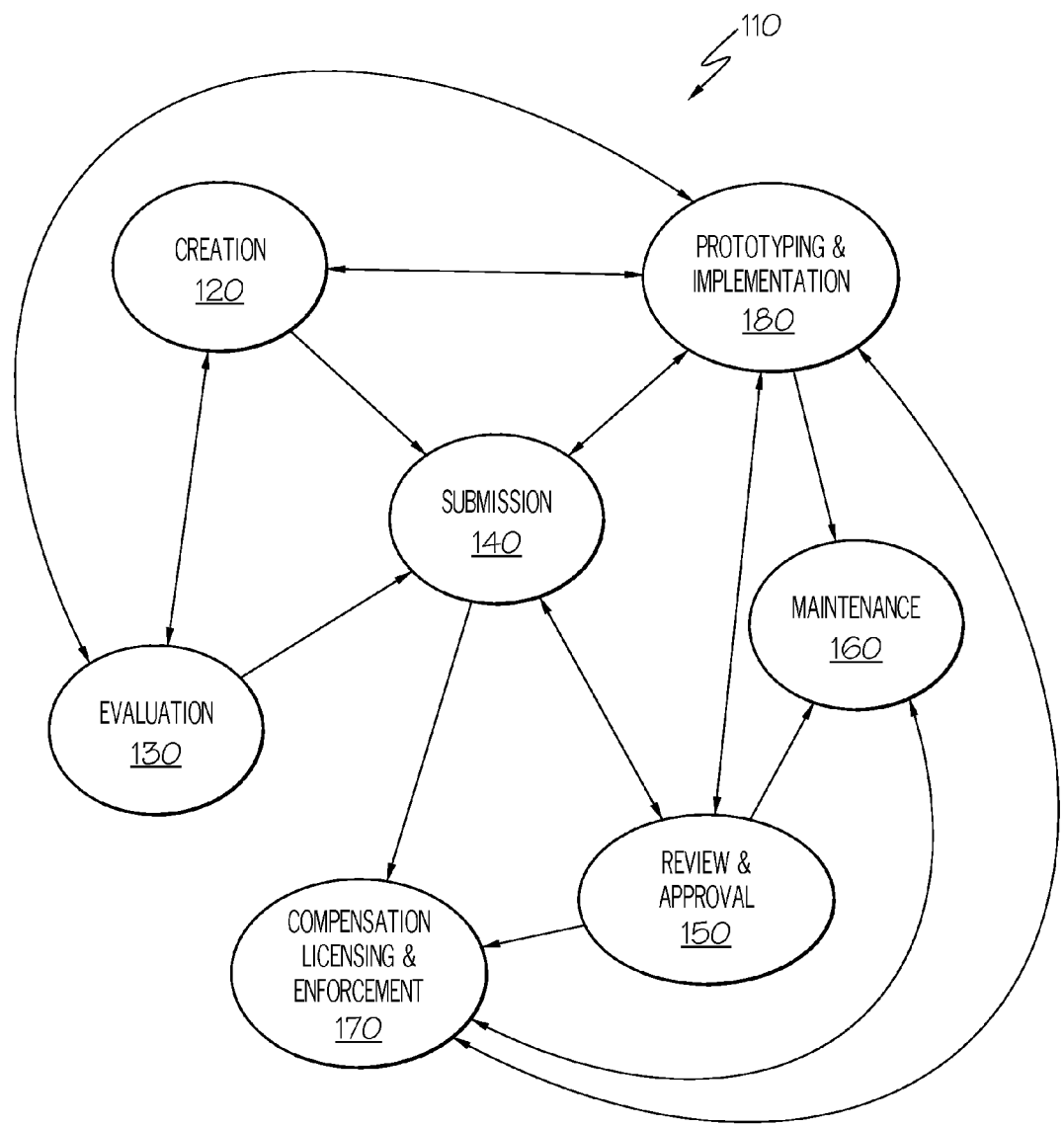
FIG. 3 is a diagram depicting phases and components of a portion of the process architecture shown in FIG. 2 in exemplary embodiments.

Turning now to FIGS. 2 and 3, an exemplary embodiment of the process architecture 100 used in implementing the collaborative intellectual property management services will now be described. The process architecture 100 of FIG. 2 includes a set of event- and time-driven phases that are collectively referred to as an intellectual property management model 110. The model 110 includes the collaborative intellectual property management application 210, which encapsulates permissions & security component 248. Permissions & security component 248, in turn, supports the collaborative intellectual property management application 210 and encapsulates workflow component 250. Workflow component 250, likewise, supports the permissions & security component 248 and encapsulates the phases 120-180 and remaining components 254-276 described above in FIG. 1. Messaging component 252 supports the model 110 and workflow component 250 with alerts and notifications.

In exemplary embodiments, the model 110 provides oversight over the entire end-to-end intellectual property phases 120-180, creators & innovators 282, evaluators 284, business developers 286, and legal professionals 288-290. At each phase, the management system 280 provides guidance, direction, and support while receiving reports from innovators & creators 282 and legal professionals 288-290. This management system provides full integration of managerial, legal, technical and business development representatives supported by a detailed and robust set of process and performance analytics, which is lacking in the art. This management system may include a group of individuals within the entity of the system 200 that are tasked with ensuring that the efficiency, effectiveness and full value is extracted from the processes, components, data and tools described herein. The management system provides a standing organizational structure with regularly scheduled meetings and specific roles and responsibilities assigned, which ensures a world-class intellectual property management system.

Through the model 110, the management system 280 provides governance, which sets strategies, determines objectives and targets, prioritizes efforts, assigns work, creates action plans, reviews analyses, allocates resources, evaluates results, and the like. This management system improves the communication between innovators & creators 282, evaluators 284, business developers 286, and legal professionals 288-290 by providing timely and sound feedback. The management system 280 is responsible for ensuring the true status of all intellectual property within the process. The management system 280 is also responsible for the effective and efficient processes to ensure the appropriate legal protections are provided for intellectual property, applicable revenue is generated from these processes, false starts are eliminated due to prior art or work in progress, and the investment-to-cash cycle time is optimized. The exemplary embodiments described herein identify where management should be involved in the IP development processes, as well as the requisite analytic tools necessary to carry out those supervisory functions. The phases 120-180 of model 110 will now be described in exemplary embodiments.

In the creation phase 120, an individual or group is challenged with solving a specific problem and determining if an innovative idea supports that challenge. The challenge may be induced by the individual's or team's planning and operations, or may be stimulated by the management system 280.

Additionally, there may be copyrighting of thought, artistic expression, and the like by individuals or groups. The process commences with the creation of intellectual property and the recognition to protect that property. The creation phase 120 provides input into the evaluation 130, submission 140, and prototyping & implementation 180 phases. In some cases, the intellectual property may go directly to the submission 140 phase, bypassing the evaluation 130 phase. During the creation phase 120, the innovators & creators 282 may go through a series of self-guided questions and associated decision tree to determine an applicable starting pointing within the collaborative intellectual property management application 210. FIG. 4 illustrates the ideas flowing into an "idea hopper" which assists in determining what intellectual property outcome should be pursued and the process choreography required within the workflow component 250. FIG. 5 illustrates an example of the workflow method facilitated by the workflow component 250. The innovators & creators 282 self-classify the intellectual property per the applicable classification system to assist in determining the resources needed for the intellectual property and to facilitate the appropriate research required.

In the evaluation phase 130, the management system 280 directs technical, legal and/or commercial evaluations by appropriate third parties to ascertain the valuation of the intellectual property in comparison to novelty, non-obviousness, operability, commercialization potential, legal considerations, revenue, costs, prestige, intellectual property portfolio, and the like. The evaluation phase 130 may recommend proceeding directly to the submission phase 140, returning to the creation phase 120 for additional refinement and innovation, concurrent efforts in the prototyping & implementation phase 180 to determine operability and non-obviousness, rejection of the intellectual property in its entirety, and the like. This feedback to the innovators & creators 282 may increase the quality of the intellectual property, improve communications, ensure uniformity and consistency, achieve freedom of action, and where appropriate, broaden the value of the intellectual property. The quality of patents may be very important in the event of licensing negotiations or litigation; hence should be thoroughly discussed and reviewed during the evaluation phase 130. With litigation on the increase, quality becomes an imperative. Additionally, the result of an evaluation could also be new intellectual property being developed. Business developers 286 and legal professionals (288-290) provide advice to creators or innovators of intellectual property development and feedback to the management system 280 on the intellectual property's value. Technical evaluations determine the feasibility and implementation considerations of the intellectual property. The commercial evaluation considers the sum of the various evaluations and the ability to realize financial benefits from the intellectual property.

In exemplary embodiments, the submission phase 140 requests legal protections from the applicable governmental entities legislated to do so. These governmental entities may be national or international regulatory bodies adhering to regulations or conventions in the granting of legal rights and privileges pertaining to intellectual property. The submission phase 140 includes the appropriate submission of documentation, signatures, and applicable fees assessed for submitting the documentation. The legal professionals 288-290 and governing entities (e.g., 292) ensure that applicable laws governing submissions are adhered to, including previous disclosures or prior implementations. In exemplary embodiments, the submission phase 140 is conducted by legal and/or paralegal professionals (e.g., 288-290), but lay persons may also be allowed to submit requests for intellectual property protections. The submission phase 140 provides input into the review & approval 150 and prototyping & implementation 180 phases. In the latter case, full implementation may proceed subsequent to the submission of the application and the like.

In exemplary embodiments, the review & approval phase 150 may be operated in accordance with the applicable rules and regulations of the governing entity (e.g., 292). The governing entity reviews the submitter's documentation for accuracy, clarity and conformance to practices, customs, rules and regulations pertaining to the type of intellectual property. The governing entity may approve the application in whole, request amendments, issue rejections, provide objections, correct errors, and the like. The submitters or their legal agents are tasked with responding in a timely fashion to the foregoing exceptions through correspondence, appeals, hearings, and the like. The objectives are to ensure the intellectual property applications obtain the requisite legal standing and properly rebut any potential restrictions. Applicable fees may be assessed by the governing entity depending on the type action required or requesting an extension of time past the specified date.

One goal of the review & approval phase 150 is to convince the governing entity (e.g., 292) to issue or grant the applicable intellectual property protections. In the event of governing entity's denial, the submitters may still publish or register the intellectual property in an authoritative publication as a means to establish the state of the art in their judgment. The review & approval phase 150 provides input into the maintenance 160, compensation, licensing & enforcement 170 and prototyping & implementation 180 phases. Once the review & approval phase 150 has been entered, there may be opportunities for compensation, licensing and implementation. Once the intellectual property has been granted legal protections, enforcement actions by the submitter may occur as a result of detected infringement, with royalties or other compensation back dated to the submission or published date. Additionally, implementation during the review & approval phase may have great positive bearing for the submitters on issues pertaining to operability and non-obviousness.

During the maintenance phase 160, payment is made regarding applicable fees based on the continuing valuation of the intellectual property. These fees and their amounts may be based upon the date of filing or granting depending on the regulatory requirements and applicable schedules. The maintenance phase 160 is dependent on input from the compensation, licensing & enforcement 170 and prototyping & implementation 180 phases to ascertain the continuing investment in the intellectual property.

In exemplary embodiments, the compensation, licensing & enforcement phase 170 is the collection of revenue, royalties and the like; the generation of licensing documents, cross-license agreements and the like; legal enforcement of infringements; and combinations thereof. This phase 170 may be closely coupled with the prototyping & implementation phase 180 where the submitter or licensee chooses to commercialize the intellectual property.

In exemplary embodiments, the prototyping & implementation phase 180 may include early prototyping during the creation 120, evaluation 130, submission 140, and review & approval 150 phases and implementation during all the foregoing phases. Working prototypes assist in determining novelty, operability, non-obviousness and commercialization potential. Implementation of intellectual property has the salient feature of obviating challenges on the basis of obviousness, but does require consideration in establishing legal bar dates (i.e., a date in time in which intellectual property can not be submitted for legal protection).

Turning now to FIG. 4, a diagram 300 depicting the various outcomes of the creation 120 phase and idea component 256 will now be described in accordance with exemplary embodiments. An idea hopper 310 represents logic and business rules 312 and determination results 314 which are currently recognized by those skilled in the art as possible outcomes 316-338 and the like. For example, item 312 may be a series of sequential, parallel or hierarchical queries to which the users (e.g., client system 282) respond with 'yes' or 'no' answers in order to determine the optimal course of action (e.g., determination results 314) and the selection of one or more possible outcomes 316-338. These outcomes 316-338, in turn, are implemented via one or more templates. The business logic 312, outcomes 316-338, and templates may be provided by the collaborative intellectual property management application 210. Some examples of queries or business rules 312 are: (1) Does the intellectual property have commercial value?, (2) Is the intellectual property discoverable in its final form?, (3) Does the organization want to produce the offering? (4) Does the intellectual property have significant market novelty?, and the like. The information provided by the users may be entered as inputs via, e.g., a user interface of the collaborative intellectual property management application 210.

In exemplary embodiments, the innovators and creators 282 start this effort in the creation phase 120, and evaluators 284, business developers 286 and internal legal professionals 288 provide additional input as part of the evaluation phase 130 which is also captured in the logic and business rules 312 to determine applicable results 316-338. In exemplary embodiments, this is a collaborative effort amongst the users (e.g., client systems 282-288) and is overseen by the management system 280.

The possible outcomes (e.g., 316-338) are converted into the workflow templates such as Patent 316, Trademark 318, Copyright 320, Trade Secret 322, Publish 324, License 328, Create Offerings 328, Sell 330, Manufacture 332, Reinvention 334, Do Nothing 336, Hybrid Workflow 338, and the like. Thus, the possible outcomes 316-338 include workflow templates within the workflow component 250 which, in turn, manages the timely processing of the intellectual property through phases 120-180. Determination results may result in identifying one or more of these workflow templates via possible outcomes 316-336. If there is more than one workflow template then the workflow wizard 340 may be invoked to produce a hybrid workflow template 338.

In exemplary embodiments, hybrid workflow template 338 is a rationalized combination of the selected workflow templates for outcomes 316-336 that takes into account the various deliverables and timelines that optimizes the end to end phases 120-180 while ensuring a quality intellectual property product.

The workflow wizard 340 may be a program product that acknowledges and manages the outcome determination 314 from the idea hopper 310. The templates selected in response to the determination results 314 may be utilized by the workflow component 250. Alternatively, the workflow component 250 may be configured to perform the requisite functions of the workflow wizard 340. The workflow component 250 provides the users (e.g., client systems 280-290) with the appropriate automated sequence guiding them through the intellectual property phases 120-180 depicted by FIG. 3.

Turning now to FIG. 5, a diagram illustrating a table provided by the workflow component 250 for a United States patent submission will now be described in exemplary embodiments. Depending on the type of intellectual property being created, the table 400 shown in FIG. 5 may be different in two major respects. First, the element column 410 may vary by the type of intellectual property or directed action contained in FIG. 4 and the like, the degree the organization chosen to implement the method and workflow products, and the requirements of the IP governing entity 292. The type of intellectual property or actions may have different types of elements and associated workflow choreography. The table 400 shown in FIG. 5 illustrates one potential workflow product stemming from a recommendation made for a patent workflow template (e.g., 316 of FIG. 4). Second, the columns 412 through 420 of table 400 may have different values for each element, again dependent on the degree to which the organization chooses to implement the method and workflow products, and the requirements of the IP governing entity 292. The organization implementing the method, system and program products may select the elements, the sequence of the elements, and has options in the specification of Required (designated as "R"), Optional (designated as "O"), and Not Applicable (designated as "N"). The selections presented in the table 400 of FIG. 5 are provided for illustrative purposes and are not to be construed as limiting in scope. Those skilled in the art would recognize that there are numerous combinations depending on the specific implementation.

The workflow of table 400 in FIG. 5 may be traversed in two directions simultaneously, e.g., from top to bottom and from left to right, with event triggers set for specific elements (column 410) and individuals or workgroups identified in columns 412 through 420. In one case, the completion of the "Detailed Description" by the Inovators & Creators (282 of FIG. 1 and column 412) may trigger a request for evaluators (284 of FIG. 1 and column 414) and business developers (286 of FIGS. 1 and 416) to perform an action. In another case, a completion of a review of the Detailed Description (column 410) by the evaluators (284 of FIG. 1 and column 414) and a completion of a review of Objects and Advantages (column 410) by the business developers (286 of FIG. 1 and column 416) may trigger a request for an internal legal professional (288 in FIG. 1 and column 420) to conduct a preliminary review. The request may be implemented, e.g., via the messaging component 252 using messaging techniques such as email, instant messaging, etc. In both cases, the underlying logic of the collaborative intellectual property management application 210 supports the evaluation phase 130 and would invoke the evaluation 260 and scheduling 264 components where applicable. In the event that no external legal professionals (290 of FIG. 1 and column 418) were involved in the intellectual property, column 418 may be rendered Not Applicable ("N") in its entirety. Accordingly, behind each workflow table is a set of rules to control the workflow, to include when training and education materials should be offered or made mandatory for specific users. In exemplary embodiments, the workflow templates are configured to respond to process improvements, new regulatory requirements specified by the IP governing entities 292 and the like. The combination and permutations of events, triggers and actions are multitudinous, hence lending themselves to automation.

Turning now to FIG. 6, a diagram depicting a table including event- and workflow-driven process phases and their respective integration with application 210 components (248-276) of the system architecture 200 of FIG. 1 and process architecture 100 of FIG. 2 will now be described in exemplary embodiments. The table of FIG. 6 illustrates the seven phases (120 through 180) horizontally and the application 210 components (248-276) vertically. An "R" within the table indicates that the application 210 component is required for the corresponding phase. An "O" within the table indicates that the application 210 component is optional or is situationally dependent for a corresponding phase. An "N" in the table indicates the application 210 component is not required for the corresponding phase. An application 210 component may support a single phase, multiple phases, or all phases. The table of FIG. 6 highlights the end-to-end process and application 210 integration desired for effective intellectual property management, that event driven processes and workflow are utilized, that application components 248-276 may be reused across various phases, and that automation is optimal for complete implementation.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer-implemented method for collaborative and integrated intellectual property management, comprising:

configuring a workflow component to sense event-driven triggers from task-based components of a collaborative intellectual property management application on a storage medium according to an intellectual property model defining a set of phases having inputs defined relative to each phase and a table defining which of the task-based components are required, optional, or not required for each of the phases, the collaborative intellectual property management application operating on a host system comprising a processor in communication with the storage medium;

receiving user responses to queries representing business rules for intellectual property management;

identifying a type of intellectual property being created based on the user responses to the queries;

selecting a workflow template that defines a sequence of the phases of the intellectual property management model, wherein the sequence of the phases is associated with the task-based components to define an end-to-end process integrated by the collaborative intellectual property management application to perform automated intellectual property management, the workflow template comprising a set of rules to control the workflow;

providing a workflow table by the workflow component for the selected workflow template based on the type of intellectual property being created, the workflow table defining elements and workgroups and which of the workgroups are required, optional, or not applicable for each of the elements, wherein completion of one or more of the elements by one or more of the workgroups identified as required results in a trigger, and one or more of the workgroups identified as not applicable are not involved in triggers;

traversing the workflow table along an element axis and a workgroup axis simultaneously, the workflow table comprising triggers for both the elements and workgroups based on values assigned to the elements and workgroups according to the set of rules to control the workflow, wherein the traversing is performed by the workflow component;

triggering a request to a first workgroup of a first element in response to sensing completion of a second element by a second workgroup of the elements and workgroups at the workflow component, the second workgroup identified as required for the second element in the workflow table, and the request implemented by a messaging component in communication with the workflow component; and automating the end-to-end process across the sequence of the phases of the selected workflow template, the implementing responsive to the event-driven triggers choreographed by the workflow component.

2. The method of claim 1, wherein the phases comprise:

a creation phase to provide input into evaluation, submission, and prototyping and implementation phases;

an evaluation phase to perform a valuation of the intellectual property and determine whether to proceed or to further refine the intellectual property in the creation phase;

a submission phase to request legal protection for the intellectual property from a governmental entity;

a review and approval phase to receive approval of the intellectual property from the governmental entity in accordance with rules and regulations applied by the governmental entity to protect the intellectual property;

a maintenance phase to meet government obligations in keeping the intellectual property protected;

a compensation, licensing, and enforcement phase to collection of revenue, generate a licensing document, and legal enforcement of infringements associated with the intellectual property; and a prototyping and implementation phase to produce a prototype embodying the intellectual property.

3. The method of claim 2, wherein the task-based components comprise:

an idea component to submit a request to protect an idea or concept, the idea component presenting a series of questions including the queries for collecting information comprising data inputs;

a classification component to classify the data inputs into a subject category; and a research component to automate a search for documents and materials that relate to the idea or concept, the search constructed using the subject category;

wherein the idea component, classification component and research component support the creation phase and share resulting information with the evaluation phase, and the workflow component invokes a workflow wizard to produce a hybrid workflow template as a combination of multiple workflow templates selected for a combination of possible outcomes to account for the user responses to the queries.

4. The method of claim 3, wherein the creation phase is supported by at least one repository of technical data that comprises the resource, wherein the search for documents and materials includes searching the repository and the sharing resulting information includes pushing documents and materials resulting from the search to an entity associated with the workgroup assigned to the creation phase and respective task-based component absent a request for the documents and materials from the entity.

5. The method of claim 2, wherein the task-based components further comprise:

an evaluation component to receive information acquired from the creation phase and processing the information resulting in a submission determination, the method further comprising:

soliciting input from at least one of a legal entity, a business development entity, an evaluator entity, and the requester, the legal entity, business development entity, evaluator entity, and the requester each comprising one of the workgroups assigned to the evaluation component; and generating a value from an analysis of the input received in response to the soliciting; and using the value to make the submission determination, the submission determination resulting in one of an approval to initiate protection for an idea or concept and a denial of a request to protect the idea or concept.

6. The method of claim 2, wherein the task-based components further comprise:

a valuation component; and an analytics component, wherein the analytics component performs:

producing valuation reports from information received by the valuation component, the valuation component determining a potential value of an intellectual property asset;

evaluating cycles times for intellectual property processes from the workflow template;

updating the workflow and messaging components with planning data resulting from evaluation of the cycle times;

analyzing billable hours from a revenue and billing component;

analyzing revenue from submitters of intellectual property materials; and analyzing deficiencies occurring from implementation of the phases and identifying training resources that address the deficiencies.

7. The method of claim 2, wherein the task-based components further comprise a submission component, the submission component including a repository of intellectual property-supported documents associated with filing submissions, the repository accessed by legal professions including at least one of:

internal professionals of an entity implementing the intellectual property management model; and external professionals providing support to the internal professionals.

8. The method of claim 2, wherein the task-based components further comprise:

a recognition component; and a revenue and billing component, wherein the recognition component includes a repository for managing financial and tangible rewards for intellectual property products, the method further comprising:

providing information relating to the financial and tangible rewards to the revenue and billing component, wherein the revenue and billing component submits expense statements to a corresponding accounting cost center.

9. The method of claim 2, wherein the task-based components further comprise a training and education component including self-guided tutorials, methods of conducting research, lessons pertaining to a type of intellectual property and degree of experience of a user, and the method further comprises:

linking training materials to the phases and the workflow component.

10. The method of claim 6, further comprising:

sensing components of the collaborative intellectual property management application for one or more applicable workflow templates and milestone discrepancies; and sending alerts, warnings, and messages to entities, the analytics component, and a management system in response to detecting milestone discrepancies.

11. A system for collaborative and integrated intellectual property management, comprising:

a host system comprising a processor and a storage medium; and a collaborative intellectual property management application comprising a workflow component and task-based components, wherein the collaborative intellectual property management application is configured to execute on the host system and perform:

configuring the workflow component to sense event-driven triggers from the task-based components according to an intellectual property model defining a set of phases having inputs defined relative to each phase and a table defining which of the task-based components are required, optional, or not required for each of the phases;

receiving user responses to queries representing business rules for intellectual property management;

identifying a type of intellectual property being created based on the user responses to the queries;

selecting a workflow template that defines a sequence of the phases of the intellectual property management model, wherein the sequence of the phases is associated with the task-based components to define an end-to-end process integrated by the collaborative intellectual property management application to perform automated intellectual property management, the workflow template comprising a set of rules to control the workflow;

providing a workflow table by the workflow component for the selected workflow template based on the type of intellectual property being created, the workflow table defining elements and workgroups and which of the workgroups are required, optional, or not applicable for each of the elements, wherein completion of one or more of the elements by one or more of the workgroups identified as required results in a trigger, and one or more of the workgroups identified as not applicable are not involved in triggers;

traversing the workflow table along an element axis and a workgroup axis simultaneously, the workflow table comprising triggers for both the elements and workgroups based on values assigned to the elements and workgroups according to the set of rules to control the workflow, wherein the traversing is performed by the workflow component;

triggering a request to a first workgroup of a first element in response to sensing completion of a second element by a second workgroup of the elements and workgroups at the workflow component, the second workgroup identified as required for the second element in the workflow table, and the request implemented by a messaging component in communication with the workflow component; and automating the end-to-end process across the sequence of the phases of the selected workflow template, the implementing responsive to the event-driven triggers choreographed by the workflow component.

12. The system of claim 11, wherein the phases comprise:
a creation phase to provide input into evaluation, submission, and prototyping and implementation phases;
an evaluation phase to perform a valuation of the intellectual property and determine whether to proceed or to further refine the intellectual property in the creation phase;
a submission phase to request legal protection for the intellectual property from a governmental entity;
a review and approval phase to receive approval of the intellectual property from the governmental entity in accordance with rules and regulations applied by the governmental entity to protect the intellectual property;
a maintenance phase to meet government obligations in keeping the intellectual property protected;
a compensation, licensing, and enforcement phase to collection of revenue, generate a licensing document, and legal enforcement of infringements associated with the intellectual property; and
a prototyping and implementation phase to produce a prototype embodying the intellectual property.

13. The system of claim 12, wherein the task-based components comprise:
an idea component to submit a request to protect an idea or concept, the idea component presenting a series of questions including the queries for collecting information comprising data inputs;
a classification component to classify the data inputs into a subject category; and
a research component to automate a search for documents and materials that relate to the idea or concept, the search constructed using the subject category;
wherein the idea component, classification component and research component support the creation phase and share resulting information with the evaluation phase, and the workflow component invokes a workflow wizard to produce a hybrid workflow template as a combination of multiple workflow templates selected for a combination of possible outcomes to account for the user responses to the queries.

14. The system of claim 13, wherein the creation phase is supported by at least one repository of technical data that comprises the resource, wherein the search for documents and materials includes searching the repository and the sharing resulting information includes pushing documents and materials resulting from the search to an entity associated with the workgroup assigned to the creation phase and respective task-based component absent a request for the documents and materials from the entity.

15. The system of claim 12, wherein the task-based components further comprise:
an evaluation component to receive information acquired from the creation phase and processing the information resulting in a submission determination, and the collaborative intellectual property management application is further configured to perform:
soliciting input from at least one of a legal entity, a business development entity, an evaluator entity, and the requester, the legal entity, business development entity, evaluator entity, and the requester each comprising one of the workgroups assigned to the evaluation component; and
generating a value from an analysis of the input received in response to the soliciting; and
using the value to make the submission determination, the submission determination resulting in one of an approval to initiate protection for an idea or concept and a denial of a request to protect the idea or concept.

16. The system of claim 12, wherein the task-based components further comprise:
a valuation component; and
an analytics component, wherein the analytics component performs:
producing valuation reports from information received by the valuation component, the valuation component determining a potential value of an intellectual property asset;
evaluating cycles times for intellectual property processes from the workflow template;
updating the workflow and messaging components with planning data resulting from evaluation of the cycle times;
analyzing billable hours from a revenue and billing component;
analyzing revenue from submitters of intellectual property materials; and
analyzing deficiencies occurring from implementation of the phases and identifying training resources that address the deficiencies.

17. The system of claim 12, wherein the task-based components further comprise a submission component, the submission component including a repository of intellectual property-supported documents associated with filing submissions, the repository accessed by legal professions including at least one of:
internal professionals of an entity implementing the intellectual property management model; and
external professionals providing support to the internal professionals.

18. The system of claim 12, wherein the task-based components further comprise:
a recognition component; and
a revenue and billing component, wherein the recognition component includes a repository for managing financial and tangible rewards for intellectual property products, and the collaborative intellectual property management application is further configured to perform:
providing information relating to the financial and tangible rewards to the revenue and billing component, wherein the revenue and billing component submits expense statements to a corresponding accounting cost center.

19. The system of claim 12, wherein the task-based components further comprise a training and education component including self-guided tutorials, methods of conducting research, lessons pertaining to a type of intellectual property and degree of experience of a user, and the collaborative intellectual property management application is further configured to perform:
  linking training materials to the phases and the workflow component.

20. The system of claim 16, wherein the collaborative intellectual property management application is further configured to perform:
  sensing components of the collaborative intellectual property management application for one or more applicable workflow templates and milestone discrepancies; and
  sending alerts, warnings, and messages to entities, the analytics component, and a management system in response to detecting milestone discrepancies.

21. A computer program product for collaborative and integrated intellectual property management, the computer program product comprising a non-transitory computer readable medium readable by a computer and storing instructions for causing the computer, when the instructions are executed, to implement a method, the method comprising:
  configuring a workflow component to sense of event-driven triggers from task-based components according to an intellectual property model defining a set of phases having inputs defined relative to each phase and a table defining which of the task-based components are required, optional, or not required for each of the phases;
  receiving user responses to queries representing business rules for intellectual property management;
  identifying a type of intellectual property being created based on the user responses to the queries;
  selecting a workflow template that defines a sequence of the phases of the intellectual property management model, wherein the sequence of the phases is associated with the task-based components to define an end-to-end process integrated to perform automated intellectual property management, the workflow template comprising a set of rules to control the workflow;
  providing a workflow table by the workflow component for the selected workflow template based on the type of intellectual property being created, the workflow table defining elements and workgroups and which of the workgroups are required, optional, or not applicable for each of the elements, wherein completion of one or more of the elements by one or more of the workgroups identified as required results in a trigger, and one or more of the workgroups identified as not applicable are not involved in triggers;
  traversing the workflow table along an element axis and a workgroup axis simultaneously, the workflow table comprising triggers for both the elements and workgroups based on values assigned to the elements and workgroups according to the set of rules to control the workflow, wherein the traversing is performed by the workflow component;
  triggering a request to a first workgroup of a first element in response to sensing completion of a second element by a second workgroup of the elements and workgroups at the workflow component, the second workgroup identified as required for the second element in the workflow table, and the request implemented by a messaging component in communication with the workflow component; and
  automating the end-to-end process across the sequence of the phases of the selected workflow template, the implementing responsive to the event-driven triggers choreographed by the workflow.

22. The computer program product of claim 21, wherein the phases comprise:
  a creation phase to provide input into evaluation, submission, and prototyping and implementation phases;
  an evaluation phase to perform a valuation of the intellectual property and determine whether to proceed or to further refine the intellectual property in the creation phase;
  a submission phase to request legal protection for the intellectual property from a governmental entity;
  a review and approval phase to receive approval of the intellectual property from the governmental entity in accordance with rules and regulations applied by the governmental entity to protect the intellectual property;
  a maintenance phase to meet government obligations in keeping the intellectual property protected;
  a compensation, licensing, and enforcement phase to collection of revenue, generate a licensing document, and legal enforcement of infringements associated with the intellectual property; and
  a prototyping and implementation phase to produce a prototype embodying the intellectual property.

23. The computer program product of claim 22, wherein the task-based components comprise:
  an idea component to submit a request to protect an idea or concept, the idea component presenting a series of questions including the queries for collecting information comprising data inputs;
  a classification component to classify the data inputs into a subject category; and
  a research component to automate a search for documents and materials that relate to the idea or concept, the search constructed using the subject category;
  wherein the idea component, classification component and research component support the creation phase and share resulting information with the evaluation phase, and the workflow component invokes a workflow wizard to produce a hybrid workflow template as a combination of multiple workflow templates selected for a combination of possible outcomes to account for the user responses to the queries.

24. The computer program product of claim 23, wherein the creation phase is supported by at least one repository of technical data that comprises the resource, wherein the search for documents and materials includes searching the repository and the sharing resulting information includes pushing documents and materials resulting from the search to an entity associated with the workgroup assigned to the creation phase and respective task-based component absent a request for the documents and materials from the entity.

25. The computer program product of claim 22, wherein the task-based components further comprise:
  an evaluation component to receive information acquired from the creation phase and processing the information resulting in a submission determination, the method further comprising:
  soliciting input from at least one of a legal entity, a business development entity, an evaluator entity, and the requester, the legal entity, business development entity, evaluator entity, and the requester each comprising one of the workgroups assigned to the evaluation component; and generating a value from an analysis of the input received in response to the soliciting; and using the value to make the submission determination, the submission determination resulting in one of an approval to initiate protection for an idea or concept and a denial of a request to protect the idea or concept.

26. The computer program product of claim 22, wherein the task-based components further comprise:
   a valuation component; and
   an analytics component, wherein the analytics component performs:
      producing valuation reports from information received by the valuation component, the valuation component determining a potential value of an intellectual property asset;
      evaluating cycles times for intellectual property processes from the workflow template;
      updating the workflow and messaging components with planning data resulting from evaluation of the cycle times;
      analyzing billable hours from a revenue and billing component;
      analyzing revenue from submitters of intellectual property materials; and
      analyzing deficiencies occurring from implementation of the phases and identifying training resources that address the deficiencies.

27. The computer program product of claim 22, wherein the task-based components further comprise a submission component, the submission component including a repository of intellectual property-supported documents associated with filing submissions, the repository accessed by legal professions including at least one of:
   internal professionals of an entity implementing the intellectual property management model; and
   external professionals providing support to the internal professionals.

28. The computer program product of claim 22, wherein the task-based components further comprise:
   a recognition component; and
   a revenue and billing component, wherein the recognition component includes a repository for managing financial and tangible rewards for intellectual property products, the method further comprising:
      providing information relating to the financial and tangible rewards to the revenue and billing component, wherein the revenue and billing component submits expense statements to a corresponding accounting cost center.

29. The computer program product of claim 22, wherein the task-based components further comprise a training and education component including self-guided tutorials, methods of conducting research, lessons pertaining to a type of intellectual property and degree of experience of a user, and the method further comprises:
   linking training materials to the phases and the workflow component.

30. The computer program product of claim 26, further comprising:
   sensing components of the collaborative intellectual property management application for one or more applicable workflow templates and milestone discrepancies; and
   sending alerts, warnings, and messages to entities, the analytics component, and a management system in response to detecting milestone discrepancies.

* * * * *